United States Patent [19]

Da Silveira

[11] Patent Number: 5,373,813
[45] Date of Patent: Dec. 20, 1994

[54] CATTLE STANCHION

[76] Inventor: John A. Da Silveira, 25251 East Mariposa Rd., Escalon, Calif. 95320

[21] Appl. No.: 121,782

[22] Filed: Sep. 15, 1993

[51] Int. Cl.$^5$ .................... A01K 1/062; A01K 1/08
[52] U.S. Cl. .................................. 119/740; 119/750
[58] Field of Search ................ 119/730, 739, 740, 750

[56] References Cited

U.S. PATENT DOCUMENTS

| Re. 34,232 | 4/1993 | DaSilveira | 119/148 |
| 4,495,897 | 1/1985 | Albers Sr. | 119/740 X |
| 5,289,798 | 3/1994 | Lock | 119/740 X |

FOREIGN PATENT DOCUMENTS

| 2423979 | 11/1979 | France | 119/740 |
| 1297774 | 3/1987 | U.S.S.R. | 119/740 |

*Primary Examiner*—Robert P. Swiatek
*Attorney, Agent, or Firm*—Julian Caplan

[57] ABSTRACT

A cattle stanchion for restraining the head of an animal. The stanchion includes a coplanar frame having an upper frame member and a pair of side frame members depending from the upper frame member and defining one stanchion opening therebetween. A restraining bar disposed in the stanchion opening is pivotally mounted to one side frame member for movement between a first position with the restraining bar extending diagonally across the stanchion opening and a second position with the restraining bar having a substantially vertical orientation. The stanchion also includes a securement assembly for securing the restraining bar in the second position. The securement system is adjustable between a deployed position for securing the restraining bar in the second position and a disengaged position for pivotal movement of the restraining bar between the first position and the second position, and includes an automated deployment system for adjusting the securement assembly between the deployed position and the disengaged position. The deployment system has an automatic operation mode for automatic adjustment of the securement assembly and a manual operation mode for manual adjustment of the securement assembly.

21 Claims, 4 Drawing Sheets

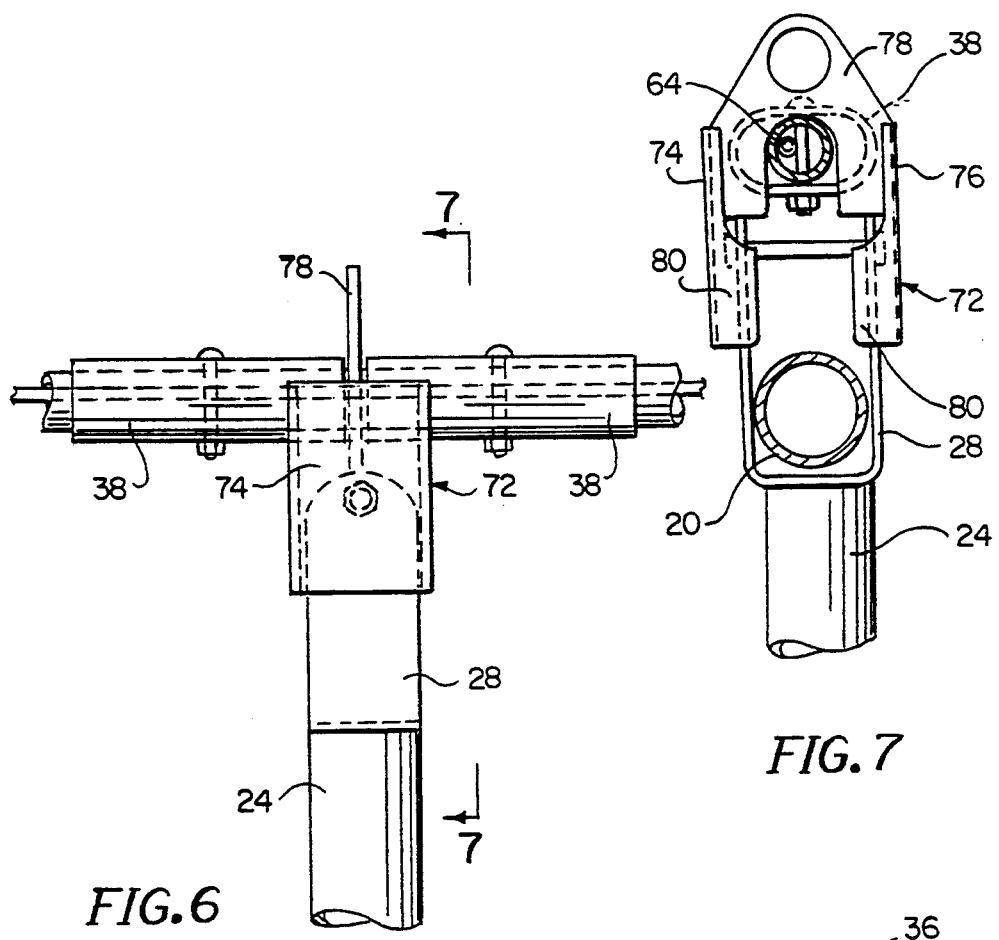
FIG. 7
FIG. 6
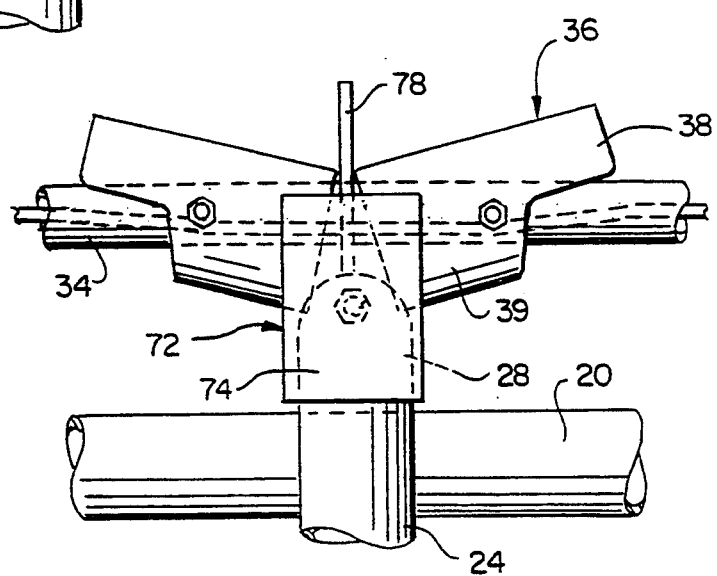
FIG. 5

CATTLE STANCHION

BACKGROUND OF THE INVENTION

1. Field of the Invention

The present invention generally relates to a cattle stanchion and, more particularly, to a cattle stanchion having a coplanar frame with at least one stanchion opening and a pivotal bar positioned in the stanchion opening and pivotally mounted to the frame.

2. Prior Art

Cattle stanchions suitable for holding the head of an animal are known in the art. The stanchions are generally used to restrain one or more head of cattle for brief periods of time. By restraining cattle during feeding, consumption may be monitored to ensure that the animals are allocated an appropriate amount of food. Restraining the cattle also facilitates veterinary examination and treatment, protecting both the animal and the attendant or veterinarian from potential injury. In dairies, stanchions are often employed to hold the cattle during the milking process. Cattle stanchions may also be used to temporarily separate one or more head of cattle from the herd.

One type of cattle stanchion includes a frame with at least one opening for receiving the head of an animal and a locking device for alternately restraining and releasing the animal. One example of this type of cattle stanchion is shown in U.S. Pat. No. Re. 34,232. The disclosed stanchion includes a pivotal bar mounted in the opening of the frame. The pivotal bar may be moved between a vertical position for holding the head of an animal and a diagonally-extending position when not in use. The disclosed stanchion also includes a locking mechanism which may be set by an attendant to either a locked or an unlocked position. When in the locked position, the locking mechanism will engage the pivot bar as it is pivoted to the vertical position, securing the animal's head within the stanchion. The animal may be released by moving the locking mechanism to the unlocked position. If desired, the attendant may leave the locking mechanism in the unlocked position so that the animals may freely insert their heads into and remove their heads from the stanchion.

With the cattle stanchion disclosed in the patent, an attendant manually adjusts the stanchion between a locked and unlocked condition to safely retain one or more head of cattle. A cattle stanchion with an automated securement system which may be automatically deployed or disabled is desirable. With an automated system, the stanchion could be automatically adjusted for restraining or releasing cattle without requiring the presence of an attendant. An automated securement system would thereby provide an improved cattle stanchion offering the advantages of increased convenience and efficiency. An automated cattle stanchion which may be easily locked and unlocked even during adverse weather conditions is similarly desirable.

A cattle stanchion with an automated securement system may automatically adjust the stanchion between a locked condition and an unlocked condition according to a predetermined schedule. A cattle stanchion with an automated securement system in which the locking mechanism may be manually deployed or disengaged at any time is also desirable. By manually operating the securement system, an attendant selectively restrains or releases one or more head of cattle independent of the predetermined schedule.

A securement system for a cattle stanchion which includes a manual locking device for independently retaining the pivot bar of one or more stanchions in a locked position is similarly desirable. By employing the locking device, one or more animals may be restrained after the stanchion had been unlocked and the cattle released. Manually restraining one or more head of cattle is particularly useful when separating animals from the herd for examination or medical treatment.

Accordingly, a primary object of the present invention is to provide a cattle stanchion with an automated securement system which may be automatically deployed or disengaged for selectively restraining or releasing the head of an animal.

A further object of the present invention is to provide a cattle stanchion with an automated securement system which may be manually deployed or disengaged by an attendant.

Another object of the present invention is to provide a cattle stanchion with an automated securement system which may be repeatedly adjusted between a locked position and an unlocked position during adverse weather conditions, particularly during freezing weather when ice might otherwise prevent removal of the latch mechanism.

An additional object of the present invention is to provide a manual locking device for individually restraining one or more head of cattle after the securement system has been disengaged to release the other cattle.

A more general object of the present invention is to provide an automated cattle stanchion which may be efficiently and conveniently used to temporarily restrain and then release the head of an animal, and which may be efficiently and inexpensively manufactured and maintained.

SUMMARY OF THE INVENTION

The automated cattle stanchion of the present invention is particularly suitable for temporarily restraining the head of at least one animal. The cattle stanchion includes a coplanar frame having a horizontally extending upper frame member and a pair of vertically extending side frame members coupled to the upper frame member. The side frame members define a stanchion opening for receiving the head of an animal. A restraining bar is disposed in the stanchion opening for restraining the animal in the stanchion. The restraining bar is pivotally mounted to the frame for movement between a first position, with the restraining bar extending diagonally across the stanchion opening, and a second position, with the restraining bar having a substantially vertical orientation. The restraining bar extends above the upper frame member when the bar is in the vertically oriented position.

The cattle stanchion includes a securement system for securing the restraining bar in the vertical position. In one form of the present invention, the securement system includes a horizontally extending locking frame rail spaced vertically above the upper frame member. A latching device is coupled to at least one of the restraining bar and the locking frame rail for securing the restraining bar in the vertically oriented position. The latching device is adjustable between a deployed position, for securing the restraining bar in the vertical position, and a disengaged position, for unrestricted movement of the restraining bar between the diagonally-extending and vertically oriented positions. The securement assembly includes an automated deployment system for automatically adjusting the latching device between the deployed position and the disengaged position. The deployment system has an automatic operation mode for automatically adjusting the latching device and a manual operation mode for manually adjusting the latching device between the deployed position and the disengaged position. A heating element heats the locking frame rail for continued operation of the latching device during freezing temperatures. The cattle stanchion also includes a manual locking device for individually retaining the restraining bar in the vertically oriented position when the latching device is disengaged.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 5 is an enlarged fragmentary view of the manual locking device of the cattle stanchion of FIG. 1, shown with the latching device deployed.

FIG. 6 is an enlarged, fragmentary view of the manual locking device of the cattle stanchion of FIG. 1, shown with the latching device disengaged.

FIG. 7 is side elevational view taken along the plane of line 7—7 in FIG. 6.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
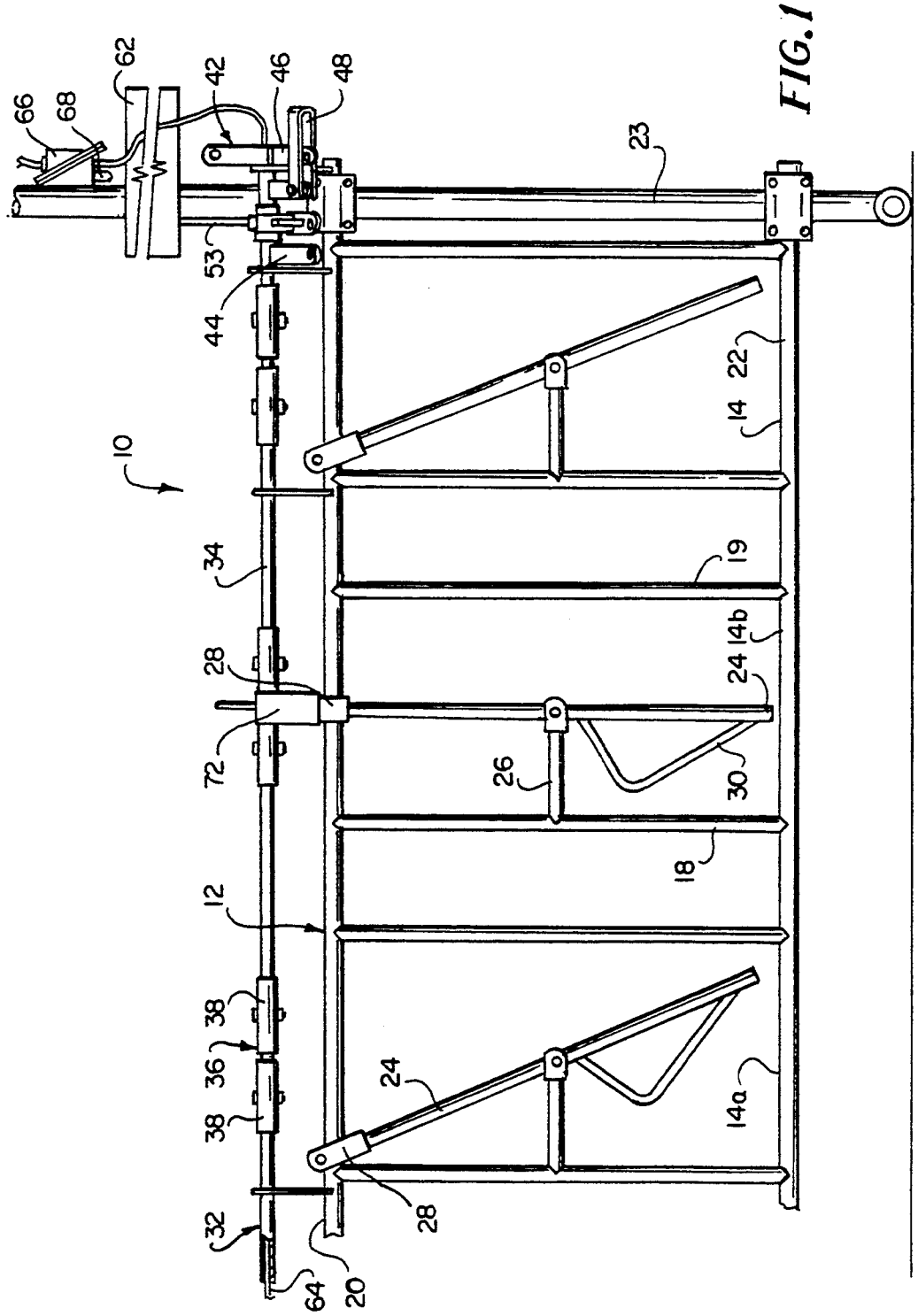
FIG. 1 is a front plan view of an automated cattle stanchion in accordance with the present invention, shown with the deployment system in the manual operation mode and the latching device disengaged.

The preferred embodiment of an automated cattle stanchion constructed in accordance with the present invention is shown in FIGS. 1-5. Cattle stanchion 10 generally includes a coplanar frame 12 with a plurality of stanchion openings 14. Three openings 14 are shown in FIG. 1; however, it is to be understood that frame 12 may include any number of stanchion openings. Each stanchion opening is defined by opposed side frame members 18 and 19 and a horizontally extending upper frame member 20. In the preferred form, frame 12 also includes a horizontally extending lower frame member 22 and a vertical support 23 disposed at one or both ends of stanchion 10. Cattle stanchion 10 also includes a restraining bar 24 pivotally mounted to one of the side frame members of each stanchion opening 14 for safely restraining the head of an animal.

In the present embodiment, restraining bar 24 is coupled to a lateral arm 26 mounted to side frame member 18. As is shown in FIG. 1, the restraining bar may be pivoted between a first position extending diagonally across stanchion opening 14a and a second, substantially vertical position as in stanchion opening 14b. When the restraining bar is in the position of stanchion opening 14a, an animal may insert its head into the area of the stanchion opening above restraining bar 24. When the animal lowers its head, the restraining bar is pivoted to the vertical position shown in stanchion 14b. Since the area between the vertically oriented restraining bar and side frame member 19 is narrower than the animal's head, locking the restraining bar in the vertical position will restrain the animal in the stanchion. When unlocked, the restraining bar may be pivoted by the animal to the diagonally-extending position of stanchion 14a so that the animal may remove its head. The upper end of the restraining bar includes a retaining ring 28 which is mounted to upper frame member 20. The retaining ring slides along the upper frame member as the restraining arm pivots about lateral arm 26. Retaining ring 28 is shaped to extend above the upper frame member so that the ring may be engaged by a securement means to secure the restraining bar in the vertically oriented position of stanchion opening 14b, as will be hereinafter described. Restraining bar 24 also preferably includes an angular arm 30 which prevents the insertion of an animal head into the area below the lateral arm and the restraining bar.

Cattle stanchion 10 of the present invention is provided with an automated securement assembly 32 for securing restraining bar 24 in the vertically oriented position of stanchion opening 14b and restraining the animal in the stanchion. In the illustrated embodiment, securement assembly 32 includes a horizontally extending locking frame rail 34 spaced vertically above upper frame member 20 and a latching device 36 pivotally mounted to the locking frame rail for engaging retaining ring 28. Locking frame rail 34 may be rotated to convert the latching device between a deployed position, shown in FIGS. 2 and 4, and a disengaged position, shown in FIGS. 1 and 3. As is shown particularly in FIG. 5, latching device 36 includes a pair of latches 38 pivotally coupled to the locking frame rail at each stanchion opening. When the latching device is deployed (FIGS. 2, 4 and 5), the latches are pivoted to lower ends 39 so that they depend below the locking frame rail for securing restraining bar 24 in the vertically oriented position. The ends 39 may be raised by pivoting the latches in an opposite direction. Latches 38 are further shaped so that when the locking bar is rotated 90° to move latching device 36 to the disengaged position (FIGS. 1 and 3), the latches do not extend significantly below the locking frame rail.

When latching device 36 is deployed (FIGS. 2, 4 and 5), restraining bar 24 will be locked in the vertically oriented position of stanchion opening 14b by latches 38. As the restraining bar is moved from a diagonally-extending position to the vertically oriented position, retaining ring 28 pivots latch 38 to raise end 39 so that the retaining ring may pass below the latch. Once retaining ring 28 has passed below latch 28, the latch pivots and lowers end 39, trapping the retaining ring between the two latches to secure the restraining bar in a vertically oriented position.

The securement assembly of the present invention includes an automatic deployment system 42 for selectively deploying and disengaging latching device 36. The deployment system has an automatic operation mode shown particularly in FIGS. 3 and 4, and preferably includes a manual operation mode, shown in FIGS. 1 and 2. In the present embodiment, deployment system 42 includes an automatic lever 44, a manual lever 46 and a coupling member 48 in the shape of a lever pivotally mounted to locking frame rail 34 by means of arm 49 fixed to rail 34. The coupling member selectively engages the automatic lever and the manual lever for operating the deployment system in the automatic and manual modes of operation, respectively. When the coupling member engages manual lever 46 (FIGS. 1 and 2), an attendant may manually rotate locking rail bar 34 to manipulate the latching device between the deployed and disengaged conditions.

Figure 2:
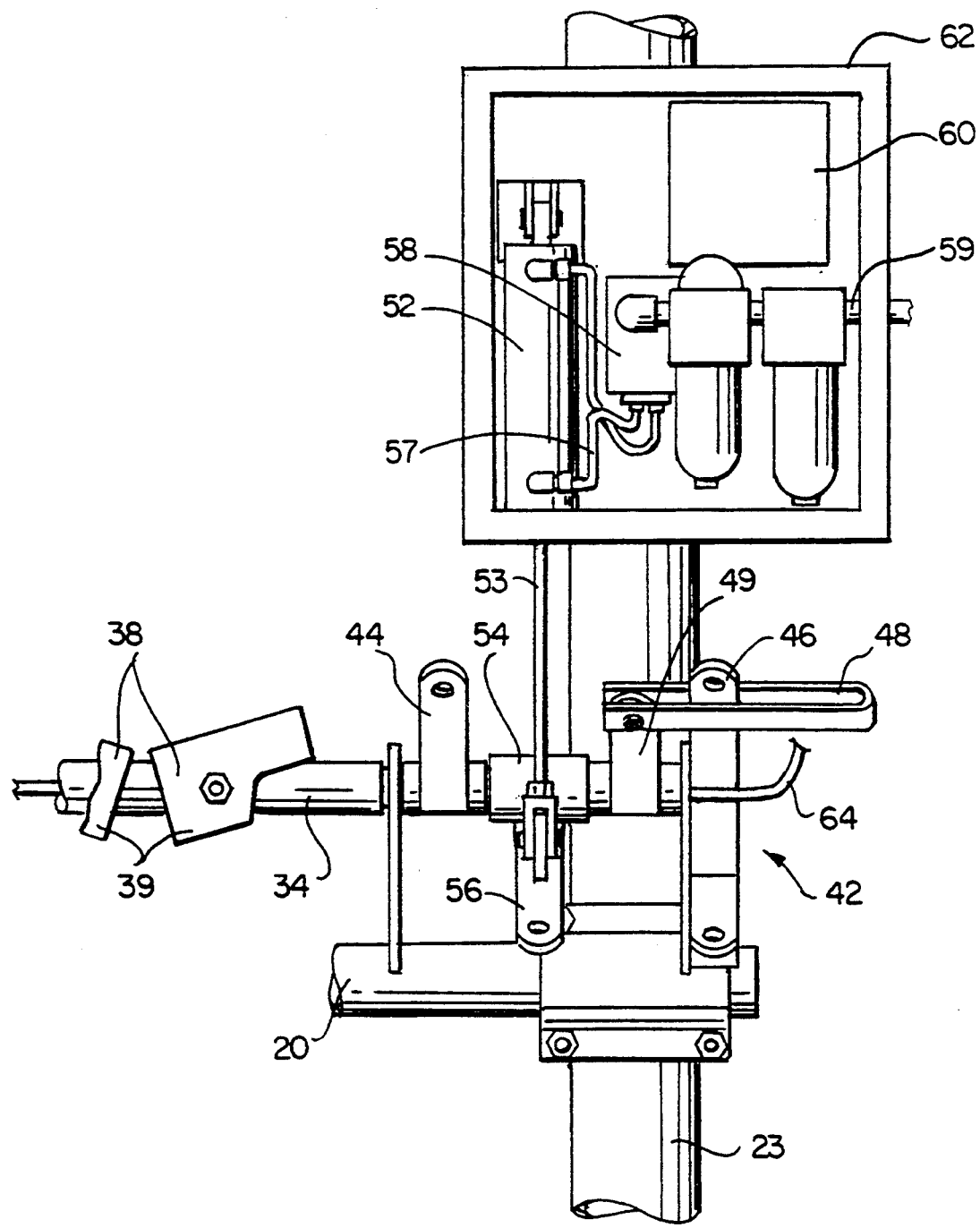
FIG. 2 is an enlarged front plan view of the securement assembly of the cattle stanchion of FIG. 1, shown with the deployment system in the manual operation mode and the latching device deployed.
Figure 4:
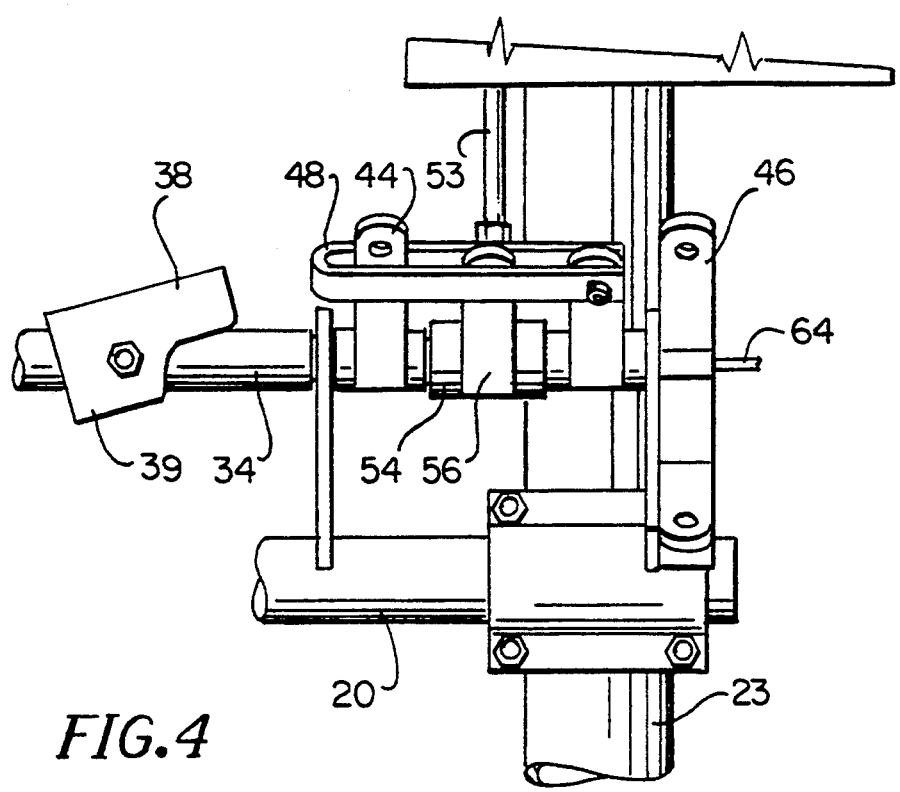
FIG. 4 is an enlarged front plan view of the securement assembly of the cattle stanchion of FIG. 1, shown with the deployment system in the automatic operation mode and the latching device deployed.
Figure 3:
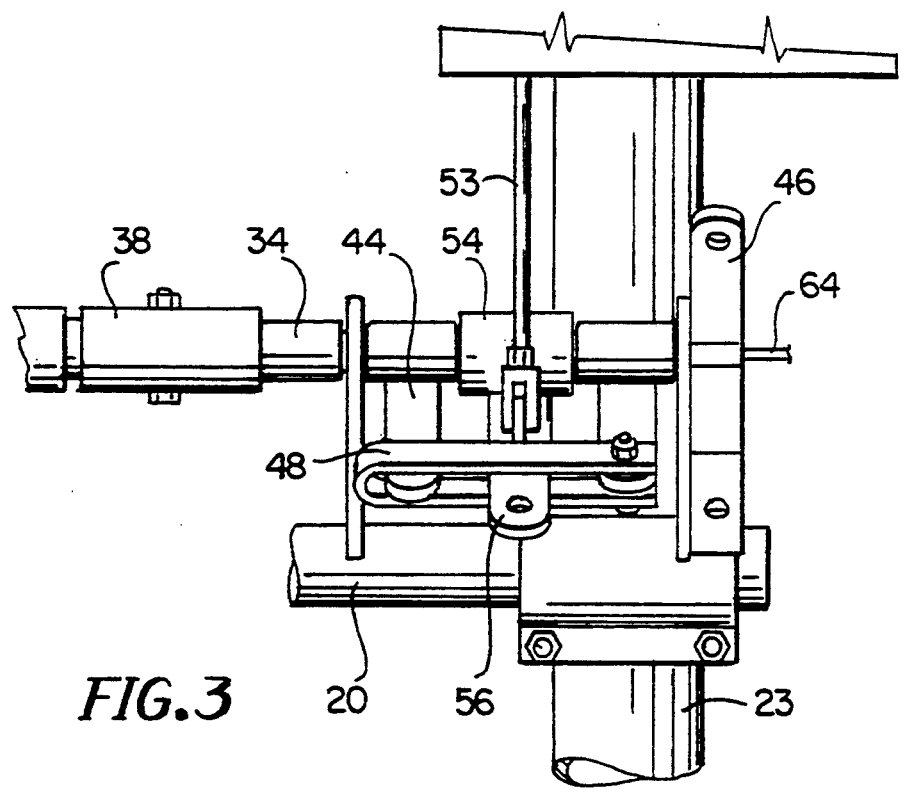
FIG. 3 is an enlarged front plan view of the securement assembly of the cattle stanchion of FIG. 1, shown with the deployment system in the automatic operation mode and the latching device disengaged.

As is shown particularly in FIG. 2, deployment system 42 includes means for automatically deploying and disengaging the latching device, such as an actuator. One such actuator is provided by a pneumatic cylinder 52 coupled by a piston 53 to a cylindrical sleeve 54. The cylindrical sleeve includes an actuator arm 56 and is rotatably mounted to locking frame rail 34. The locking frame rail rotates relative to sleeve 54 when the deployment system is in the manual operation mode. When the deployment system is in the automatic mode of operation, coupling member 48 secures automatic lever 44 and actuator arm 56 together, coupling pneumatic cylinder 52 to the locking frame rail. Piston 53 is driven by the pneumatic cylinder to move the coupled automatic lever and actuator arm between the positions shown in FIGS. 3 and 4, rotating the locking frame rail to selectively deploy and disengage latching device 36.

As is shown in FIG. 2, pneumatic cylinder 52 is coupled by tubing 57 to a valve 58 which is coupled by tubing 59 to a supply of compressed air (not shown). When activated, the valve injects the compressed air into the cylinder to drive piston 53 and move actuator arm 56. A timing device 60 is electrically connected to the valve for controlling actuation of cylinder 52. The timing device 60 is programmed to control the automatic deployment and disengagement of the latching device according to a predetermined schedule. The pneumatic cylinder, valve and timing device may be positioned within a container 62 which may be conveniently opened for maintenance, protecting the components of the deployment system from damage. It should be understood that while a pneumatic cylinder and timing device are shown in the present embodiment, other means for automatically deploying and disengaging the latching means may be used. For example, the pneumatic cylinder may be replaced by a hydraulic cylinder or a solenoid. Although not shown, cattle stanchion 10 may also include a locking mechanism, such as a clasp on a chain mounted to the locking frame rail, for releasably securing the coupling member to the automatic and manual levers, respectively.

The automated deployment system may be used to automatically deploy the latching device to temporarily restrain cattle in the stanchion and, after a period of time, automatically release the cattle from the stanchion. With the automated cattle stanchion of the present invention, cattle may be simultaneously restrained in several cattle stanchions at different locations without requiring the presence of an attendant at each stanchion. Thus, cattle stanchion 10 may be conveniently used with a large herd of cattle. The securement system shown in the preferred embodiment is particularly suitable for conveniently and efficiently restraining and releasing cattle, and may be inexpensively and efficiently constructed and maintained. However, it is to be understood the other securement means may be substituted for locking frame rail 34 and latching device 36.

As is shown particularly in FIGS. 1 and 7, cattle stanchion 10 includes a heating element 64 extending through locking frame rail 35 for heating locking frame rail 34, latching device 36 and automated deployment system 42. The heating element is preferably formed of a wire coupled to a power supply 66 and thermostat 68 mounted to vertical support 23. During adverse weather conditions the securement assembly may become frozen, substantially inhibiting deployment and disengagement of the latching device. When the thermostat senses that the temperature has fallen below a predetermined level, the power supply sends a current through the heating element. The heating element emits heat as current flows through the wire by reason of the resistance of the wire. Freezing of the locking device is inhibited by the heat emitted by the heating element. With the heating element 64, securement assembly 32 may be efficiently deployed and disengaged, alternately restraining and releasing cattle, even during adverse weather conditions.

Turning particularly to FIGS. 5-7, cattle stanchion 10 further includes a manual locking device 72 for individually restraining one or more head of cattle after disengaging latching device 36. Locking device 72 includes spaced apart arm portions 74 and 76 joined together by a U-shaped bridge portion 78 which is shaped to receive locking frame rail 34. Locking device 72 is preferably installed when the latching device is deployed with the restraining bar secured in the vertically oriented position. Locking device 72 is mounted to the locking frame rail with bridge portion 78 inserted between latches 38 and the arm portions positioned to either side of retaining ring 28. As is shown in FIG. 7, arm portions 74 and 76 include engagement means such as a pair of inturned tabs 80 which engage the restraining ring and prevent pivoting of restraining bar 24 about lateral arm 26. The inturned tabs are shaped to engage the retaining ring without restricting rotation of the latches when latching device 36 is disengaged so that the latching device may be automatically or manually disengaged when the locking device 72 is installed on locking frame rail 34. In other embodiments of the present invention, other means for releasably securing two components together may be substituted for tabs 80.

As shown in FIG. 1, the locking device retains restraining bar 24 in a vertically oriented position to hold the animal head within stanchion opening 14b. After the other cattle have left the stanchion, the animal restrained in stanchion opening 14b may be easily examined and treated if necessary. If desired, additional locking devices may be used to restrain several head of cattle within stanchion 10 after the latching device has been disengaged. Thus, locking device 72 of the present invention provides a convenient and efficient means for restraining selected animals after the cattle have been released.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A cattle stanchion comprising:
   a coplanar frame having a horizontally extending upper frame member and a pair of vertically extending side frame members depending from said upper frame member and defining one stanchion opening therebetween;
   a restraining bar disposed in said stanchion opening, said restraining bar being pivotally mounted to said frame for movement between a first position with said restraining bar extending diagonally across said stanchion opening and a second position with said restraining bar having a substantially vertical orientation; and
   securement means for securing said restraining bar in said second position, said securement means being adjustable between a deployed position for securing said restraining bar in said second position and a disengaged position for pivotal movement of said restraining bar between said first position and said second position, said securement means including an automated deployment assembly for adjusting said securement means between said deployed position and said disengaged position, said deployment assembly having an automatic operation mode for automatic adjustment of said securement means and a manual operation mode for manual adjustment of said securement means.

2. The cattle stanchion of claim 1 wherein,
   said deployment assembly includes a first lever mounted to said securement means, means for automatically moving said first lever to adjust said securement means between said deployed position and said disengaged position, and a coupling member selectively coupling said automatic moving means and said first lever together when said deployment assembly is in said automatic operation mode.

3. The cattle stanchion of claim 2 wherein,
   said automatic moving means comprises an actuator and a timing device controlling actuation of said actuator.

4. The cattle stanchion of claim 3 wherein,
   said actuator is a pneumatic cylinder.

5. The cattle stanchion of claim 2 wherein,
   said deployment assembly includes a second lever mounted to said securement means, said coupling member engaging said second lever when said deployment assembly is in said manual operation mode.

6. The cattle stanchion of claim 1 wherein,
   said frame includes a plurality of said side frame members with adjacent pairs of said side frame members each defining one stanchion opening therebetween.

7. The cattle stanchion of claim 1, further comprising means for heating said securement means for operation of said securement means in adverse weather conditions.

8. The cattle stanchion of claim 7 wherein, said securement means includes a horizontally extending locking frame rail spaced vertically above said upper frame member, said locking frame rail being hollow, and said heating means includes a resistance heated wire extending through said locking frame rail.

9. The cattle stanchion of claim 1, further comprising,
   a manual locking device mountable to said securement means when in said deployed position with said restraining bar secured in said second position, said locking device retaining said restraining bar in said second position when said securement means is adjusted to said disengaged position.

10. A cattle stanchion comprising:
    a coplanar frame having a horizontally extending upper frame member and a pair of vertically extending side frame members coupled to said upper frame member and defining a stanchion opening therebetween;
    a restraining bar disposed in said stanchion opening, said restraining bar being pivotally mounted to said frame for movement between a first position with said restraining bar extending diagonally across said stanchion opening and a second position with said restraining bar having a substantially vertical orientation, said restraining bar extending above said upper frame member when in said second position;
    a horizontally extending locking frame rail spaced vertically above said upper frame member;
    latch means for securing said restraining bar in said second position, said latch means being adjustable between a deployed position for securing said restraining bar in said second position and a disengaged position for unrestricted movement of said restraining bar between said first position and said second position; and
    automated deployment means for adjusting said latch means between said deployed position and said disengaged position, said deployment means having an automatic operation mode and a manual operation mode for selectively automatically adjusting and manually adjusting said latch means between said deployed position and said disengaged position.

11. The cattle stanchion of claim 10 wherein,
    said locking frame rail is rotatable relative to said upper frame member,
    said latch means is adjustable between said deployed position and said disengaged position by rotating said locking frame rail, and
    said deployment means is coupled to said locking frame rail for rotating said locking frame rail and adjusting said latch means.

12. The cattle stanchion of claim 11 wherein,
    said deployment means includes a first lever mounted to said locking frame rail, means for automatically moving said first lever to rotate said locking frame rail, and a coupling member selectively coupling said first lever to said automatic moving means when said deployment means is in said automatic operation mode.

13. The cattle stanchion of claim 12 wherein, said automatic moving means includes a second lever rotatably mounted to said locking frame rail and a pneumatic cylinder assembly mounted to said second lever, said coupling member coupling said first lever and said second lever together when said deployment means is in said automatic operation mode.

14. The cattle stanchion of claim 10, further including means for heating at least one of said latch means and said locking frame rail for operation of said deployment means in adverse weather conditions.

15. The cattle stanchion of claim 14 wherein, said heating means includes a resistance heating wire substantially extending through said locking frame rail.

16. The cattle stanchion of claim 10, further comprising
a manual locking device for independently securing said restraining bar in said second position when said latch means is in said disengaged position, said locking device being mountable to said locking frame rail with said latch means in said deployed position and said restraining bar secured in said second position.

17. The cattle stanchion of claim 10 wherein, said restraining bar includes a retaining ring slidably mounted to said upper frame member, said retaining ring moving along said upper frame member when said restraining bar is pivoted between said first position and said second position, said retaining ring being formed to extend above said upper frame member when said restraining bar is in said second position.

18. The cattle stanchion of claim 10 wherein, said latch means is pivotally mounted to said locking bar, said restraining bar being movable past said latch means when said restraining bar is pivoted from said first position to said second position, said latch means substantially preventing movement of said restraining bar from said second position to said first position when said latch means is in said deployed position.

19. The cattle stanchion of claim 10 wherein, said deployment means includes an actuator selectively coupled to said locking frame rail for rotating said locking frame rail relative to said upper frame member for adjusting said latch means between said deployed position and said disabled position.

20. A cattle stanchion of the type having a coplanar frame with a plurality of vertically extending side frame members mounted to an upper frame member with adjacent pairs of said side frame members each defining one stanchion opening therebetween, a restraining bar pivotally mounted to said frame for movement between a first position extending diagonally across said stanchion opening and a second position with said restraining bar having a substantially vertical orientation, said restraining bar extending above said upper frame member when in said second position, a locking frame rail spaced vertically above said side frame member, and latch means for securing said restraining bar in said second position, said latch means being adjustable between a deployed position and a disengaged position,
the improvement in said cattle stanchion comprising a manual locking device mountable to said locking frame rail with said latch means in said deployed position and said restraining bar secured in said second position, said locking device being formed for retaining said restraining bar in said second position when said latch means is in said disengaged position, said locking device having a pair of opposed arm portions depending on opposite sides of said restraining bar when said locking device is mounted to said locking frame rail, said arm portions having engagement means for engaging said restraining bar and preventing pivotal movement of said restraining bar relative to said locking frame rail.

21. The cattle stanchion of claim 20 wherein, said arm portions each have a pair of inturned tabs formed for securing said restraining bar in said second position and being further configured for movement of said latch means between said deployed position and said disengaged position, said tabs comprising said engagement means.

* * * * *